(12) United States Patent
Morris et al.

(10) Patent No.: US 11,434,763 B2
(45) Date of Patent: Sep. 6, 2022

(54) SINGLE-TRANSPORT MOBILE ELECTRIC POWER GENERATION

(71) Applicant: Typhon Technology Solutions, LLC, The Woodlands, TX (US)

(72) Inventors: Jeffrey G. Morris, The Woodlands, TX (US); Brett Vann, The Woodlands, TX (US)

(73) Assignee: Typhon Technology Solutions, LLC, The Woodlands, TX (US)

(*) Notice: Subject to any disclaimer, the term of this patent is extended or adjusted under 35 U.S.C. 154(b) by 0 days.

(21) Appl. No.: 16/861,063

(22) Filed: Apr. 28, 2020

(65) Prior Publication Data

US 2020/0347725 A1    Nov. 5, 2020

Related U.S. Application Data

(60) Provisional application No. 62/841,558, filed on May 1, 2019.

(51) Int. Cl.
 *F01B 23/10* (2006.01)
 *H02K 5/20* (2006.01)
 (Continued)

(52) U.S. Cl.
 CPC .......... *F01B 23/10* (2013.01); *B01D 46/0002* (2013.01); *F01B 27/00* (2013.01);
 (Continued)

(58) Field of Classification Search
 CPC .......... F01B 23/10; F01B 27/00; H02K 5/20; H02K 7/116; H02K 7/1823; H02K 9/26;
 (Continued)

(56) References Cited

U.S. PATENT DOCUMENTS 3,791,682 A   2/1974   Mitchell
5,095,221 A   3/1992   Tyler
(Continued)

FOREIGN PATENT DOCUMENTS

AR    087298    3/2014
AR    092923    5/2015
(Continued)

OTHER PUBLICATIONS

International Search Report and Written Opinion of PCT Application No. PCT/US2020/030306 dated Jul. 28, 2020, 14 pages.
(Continued)

*Primary Examiner* — Charles Reid, Jr.
(74) *Attorney, Agent, or Firm* — Fenwick & West LLP

(57) ABSTRACT

An apparatus for providing mobile electric power includes a power generation transport. The power generation transport includes an air inlet filter housing, an inlet plenum coupled to the air inlet filter housing, an exhaust collector, an exhaust implement coupled to the exhaust collector, a gas turbine, a generator driven by the gas turbine, and an elevating system configured to elevate the exhaust implement to convert the power generation transport to an operational mode, and lower the exhaust implement back down to convert the power generation transport to a transportation mode. The elevating system performs the elevating and the lowering without utilizing any external mechanical apparatus. The air inlet filter housing, the inlet plenum, the exhaust collector, the exhaust implement, the gas turbine, the generator, and the elevating system are mounted on the power generation transport.

24 Claims, 7 Drawing Sheets

(51) Int. Cl.
| | |
|---|---|
| H02K 7/116 | (2006.01) |
| H02K 7/18 | (2006.01) |
| H02K 9/26 | (2006.01) |
| F01B 27/00 | (2006.01) |
| F02C 7/36 | (2006.01) |
| B01D 46/00 | (2022.01) |
| F02M 35/024 | (2006.01) |

(52) U.S. Cl.
CPC ......... *F02C 7/36* (2013.01); *F02M 35/02416* (2013.01); *H02K 5/20* (2013.01); *H02K 7/116* (2013.01); *H02K 7/1823* (2013.01); *H02K 9/26* (2013.01); *B01D 2279/60* (2013.01); *F05D 2220/32* (2013.01); *F05D 2220/76* (2013.01); *H02K 2205/09* (2013.01)

(58) Field of Classification Search
CPC ... H02K 2205/09; F02C 7/36; B01D 46/0002; B01D 2279/60; F02M 35/02416; F05D 2220/32; F05D 2220/76
USPC .......................................................... 290/52
See application file for complete search history.

(56) References Cited

U.S. PATENT DOCUMENTS

| | | | |
|---|---|---|---|
| 5,517,822 | A | 5/1996 | Haws et al. |
| 6,007,227 | A | 12/1999 | Carlson |
| 6,334,746 | B1 | 1/2002 | Nguyen et al. |
| 6,765,304 | B2 | 7/2004 | Baten et al. |
| 6,786,051 | B2 | 9/2004 | Kristich et al. |
| 7,114,322 | B2 | 10/2006 | Yamanaka et al. |
| 7,581,379 | B2 | 9/2009 | Yoshida et al. |
| 7,608,935 | B2 | 10/2009 | Scherzer |
| 7,683,499 | B2 | 3/2010 | Saucier |
| 7,819,209 | B1 | 10/2010 | Bezner |
| 8,587,136 | B2 | 11/2013 | Williams |
| 8,745,991 | B2 | 6/2014 | Kim et al. |
| 8,872,366 | B2 | 10/2014 | Campion et al. |
| 9,068,506 | B2 | 6/2015 | Eleftheriou et al. |
| 9,103,193 | B2 | 8/2015 | Coli et al. |
| 9,121,257 | B2 | 9/2015 | Coli et al. |
| 9,140,110 | B2 | 9/2015 | Coli et al. |
| 9,366,114 | B2 * | 6/2016 | Coli .................. E21B 43/2607 |
| 9,475,020 | B2 | 10/2016 | Coli et al. |
| 9,475,021 | B2 | 10/2016 | Coli et al. |
| 9,534,473 | B2 | 1/2017 | Morris et al. |
| 10,030,579 | B2 | 7/2018 | Austin et al. |
| 10,107,084 | B2 | 10/2018 | Coli et al. |
| 10,107,085 | B2 | 10/2018 | Coli et al. |
| 10,221,668 | B2 | 3/2019 | Coli et al. |
| 10,227,855 | B2 | 3/2019 | Coli et al. |
| 10,502,042 | B2 | 12/2019 | Coli et al. |
| 10,544,753 | B2 | 1/2020 | Filippone |
| 10,648,312 | B2 | 5/2020 | Coli et al. |
| 10,689,961 | B2 | 6/2020 | Coli et al. |
| 10,718,194 | B2 | 7/2020 | Coli et al. |
| 10,724,353 | B2 | 7/2020 | Coli et al. |
| 10,774,630 | B2 | 9/2020 | Coli et al. |
| 10,837,270 | B2 | 11/2020 | Coli et al. |
| 10,851,634 | B2 | 12/2020 | Coli et al. |
| 10,876,386 | B2 | 12/2020 | Coli et al. |
| 10,895,138 | B2 | 1/2021 | Coli et al. |
| 2003/0057704 | A1 | 3/2003 | Baten et al. |
| 2003/0079479 | A1 | 5/2003 | Kristich et al. |
| 2004/0188360 | A1 | 9/2004 | Armstrong et al. |
| 2006/0080971 | A1 | 4/2006 | Smith et al. |
| 2006/0225402 | A1 | 10/2006 | Kierspe et al. |
| 2006/0254281 | A1 | 11/2006 | Badeer et al. |
| 2008/0048456 | A1 | 2/2008 | Browning et al. |
| 2008/0266758 | A1 | 10/2008 | Hurt |
| 2009/0015021 | A1 | 1/2009 | Towada |
| 2014/0096974 | A1 | 4/2014 | Coli et al. |
| 2014/0138079 | A1 | 5/2014 | Broussard et al. |
| 2014/0157778 | A1 | 6/2014 | Ponnuraj et al. |
| 2014/0174717 | A1 | 6/2014 | Broussard et al. |
| 2015/0033698 | A1 | 2/2015 | Cuevas et al. |
| 2015/0068724 | A1 | 3/2015 | Coli et al. |
| 2015/0300145 | A1 | 10/2015 | Coli et al. |
| 2015/0300291 | A1 | 10/2015 | Yamanaka et al. |
| 2015/0314255 | A1 | 11/2015 | Coli et al. |
| 2016/0177675 | A1 | 6/2016 | Morris et al. |
| 2016/0177678 | A1 | 6/2016 | Morris et al. |
| 2016/0208593 | A1 | 7/2016 | Coli et al. |
| 2016/0208594 | A1 | 7/2016 | Coli et al. |
| 2016/0248230 | A1 | 8/2016 | Tawy et al. |
| 2016/0326855 | A1 | 11/2016 | Coli et al. |
| 2016/0369609 | A1 | 12/2016 | Morris et al. |
| 2017/0036178 | A1 | 2/2017 | Coli et al. |
| 2017/0037718 | A1 | 2/2017 | Coli et al. |
| 2017/0104389 | A1 | 4/2017 | Morris et al. |
| 2017/0129338 | A1 | 5/2017 | Cryer et al. |
| 2017/0259227 | A1 | 9/2017 | Morris et al. |
| 2018/0080377 | A1 | 3/2018 | Austin et al. |
| 2018/0202356 | A1 | 7/2018 | Godman |
| 2018/0363434 | A1 | 12/2018 | Coli et al. |
| 2018/0363435 | A1 | 12/2018 | Coli et al. |
| 2018/0363436 | A1 | 12/2018 | Coli et al. |
| 2018/0363437 | A1 | 12/2018 | Coli et al. |
| 2018/0363438 | A1 | 12/2018 | Coli et al. |
| 2019/0055827 | A1 | 2/2019 | Coli et al. |
| 2019/0063341 | A1 | 2/2019 | Davis |
| 2019/0112908 | A1 | 4/2019 | Coli et al. |
| 2019/0169971 | A1 | 6/2019 | Oehring et al. |
| 2019/0204021 | A1 | 7/2019 | Morris et al. |
| 2019/0211661 | A1 | 7/2019 | Reckels et al. |
| 2019/0271218 | A1 | 9/2019 | Coli et al. |
| 2019/0277125 | A1 | 9/2019 | Coli et al. |
| 2019/0277126 | A1 | 9/2019 | Coli et al. |
| 2019/0277127 | A1 | 9/2019 | Coli et al. |
| 2019/0277128 | A1 | 9/2019 | Coli et al. |
| 2020/0040762 | A1 | 2/2020 | Boyce et al. |
| 2020/0318467 | A1 | 10/2020 | Coli et al. |
| 2020/0347710 | A1 | 11/2020 | Coli et al. |
| 2020/0347711 | A1 | 11/2020 | Coli et al. |

FOREIGN PATENT DOCUMENTS

| | | |
|---|---|---|
| AR | 104823 | 8/2017 |
| AR | 104824 | 8/2017 |
| AR | 104825 | 8/2017 |
| AR | 104826 | 8/2017 |
| CA | 2678638 A1 | 11/2008 |
| CA | 2845347 C | 6/2012 |
| CA | 2835904 C | 10/2012 |
| CA | 2900387 C | 10/2012 |
| CA | 2955706 A1 | 10/2012 |
| CA | 2773843 C | 1/2016 |
| CA | 2639418 C | 3/2019 |
| EP | 2726705 B1 | 5/2014 |
| EP | 2904200 A1 | 8/2015 |
| EP | 3444430 A1 | 2/2019 |
| EP | 3444431 A1 | 2/2019 |
| EP | 3444432 A1 | 2/2019 |
| EP | 3447239 A1 | 2/2019 |
| EP | 3453827 A2 | 3/2019 |
| EP | 3456915 A1 | 3/2019 |
| MX | 358054 B | 8/2018 |
| MX | 362628 B | 1/2019 |
| MX | 365888 B | 6/2019 |
| MX | 365889 B | 6/2019 |
| MX | 366049 B | 6/2019 |
| WO | 2014053056 A1 | 4/2014 |

OTHER PUBLICATIONS

International Search Report and Written Opinion of PCT Application No. PCT/US2020/055592 dated Jan. 21, 2021, 15 pages.
Powerpoint presentation: TM2500 & TM2500+ Mobile Gas Turbine Generator; retrieved Oct. 9, 2014 from www.scawa.com/files/SCA_TM2500.pdf.

(56) References Cited

OTHER PUBLICATIONS

EPO Search Report filed in EP counterpart Application No. 15870991.5 dated Oct. 15, 2018, 13 pages.
MX358054 Google Patents English Translation Published on Oct. 8, 2015, 11 pages.
MX362628 Espacenet English Abstract Published Jan. 29, 2019, 1 page.
MX365888 Espacenet English Abstract published on Jun. 19, 2019, 1 page.
MX365889 Espacenet English Abstract published on Jun. 19, 2019, 1 page.
MX366049 Espacenet English Abstract published on Jun. 26, 2019, 1 page.
United States Office Action, U.S. Appl. No. 17/066,226, dated Mar. 2, 2022.

\* cited by examiner

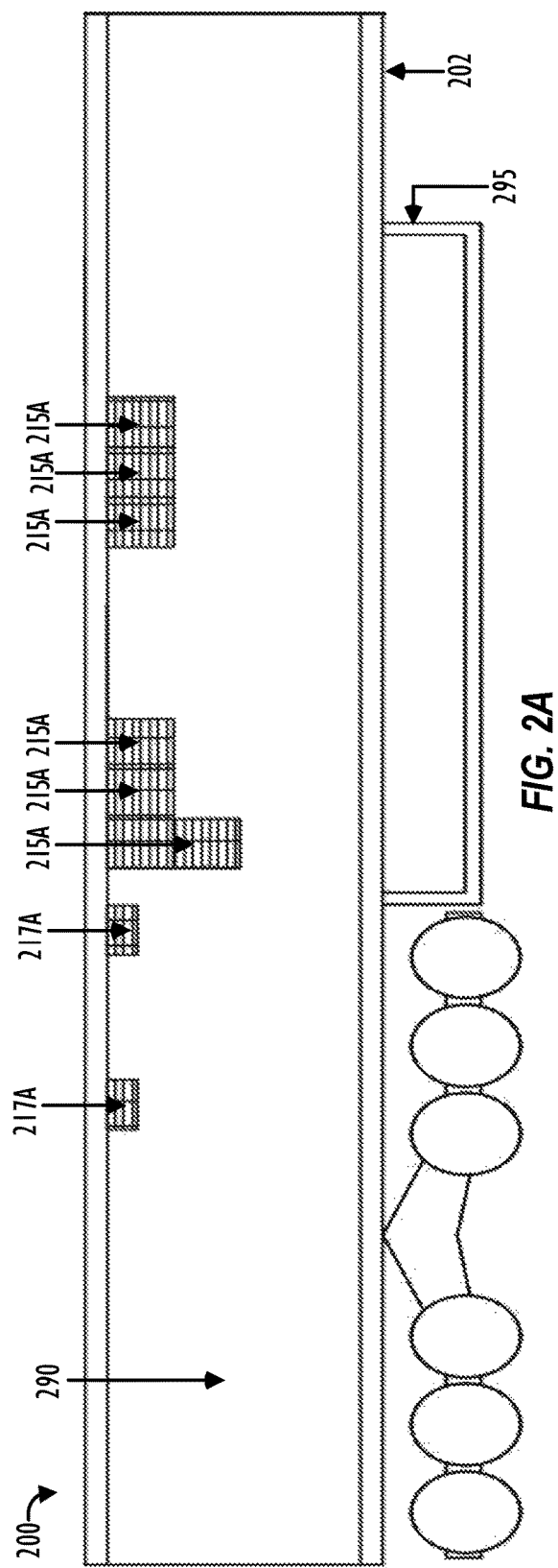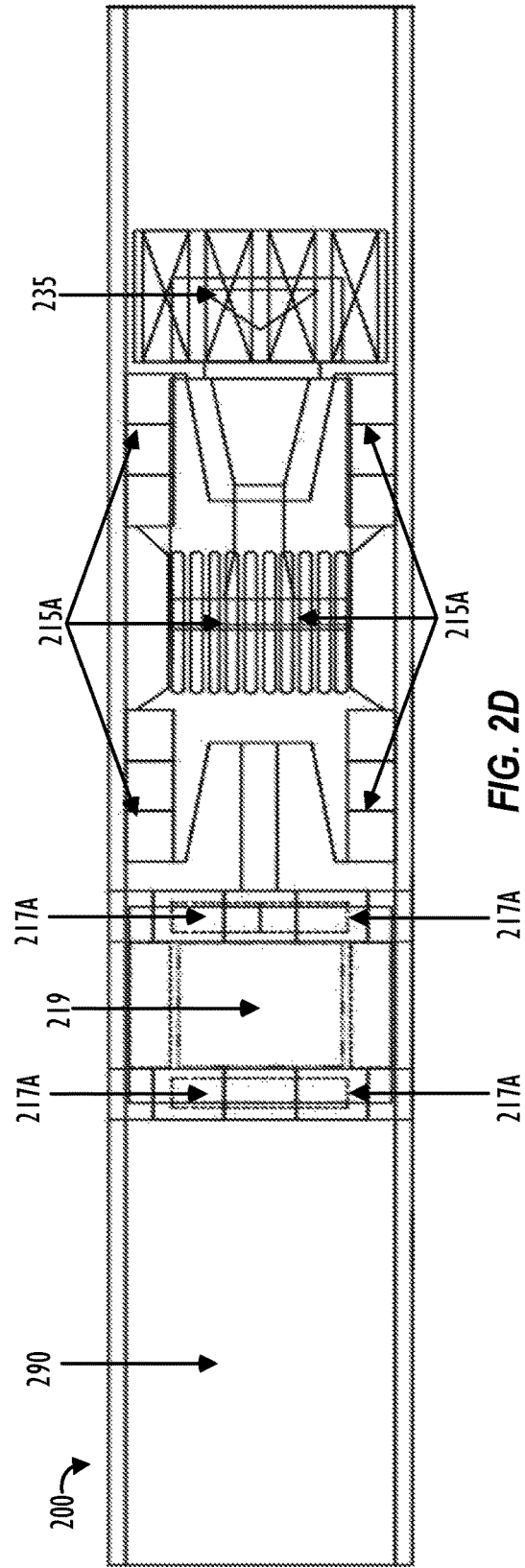

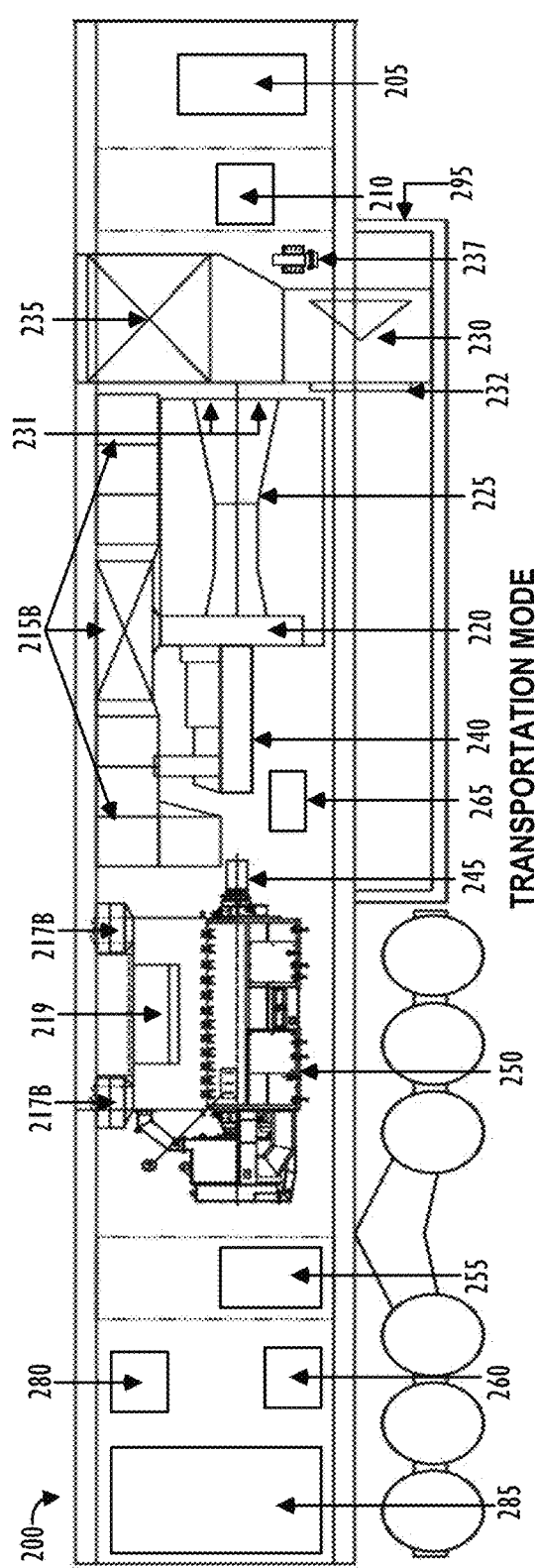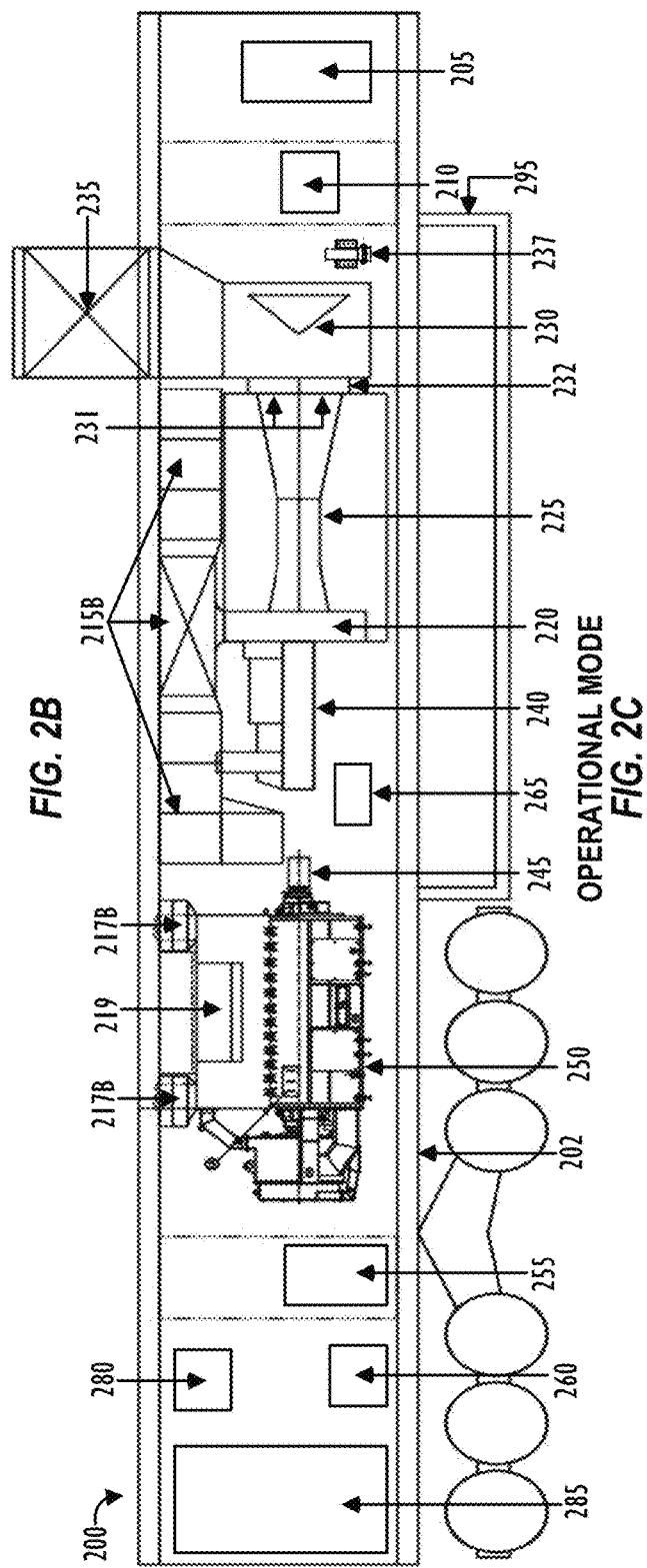

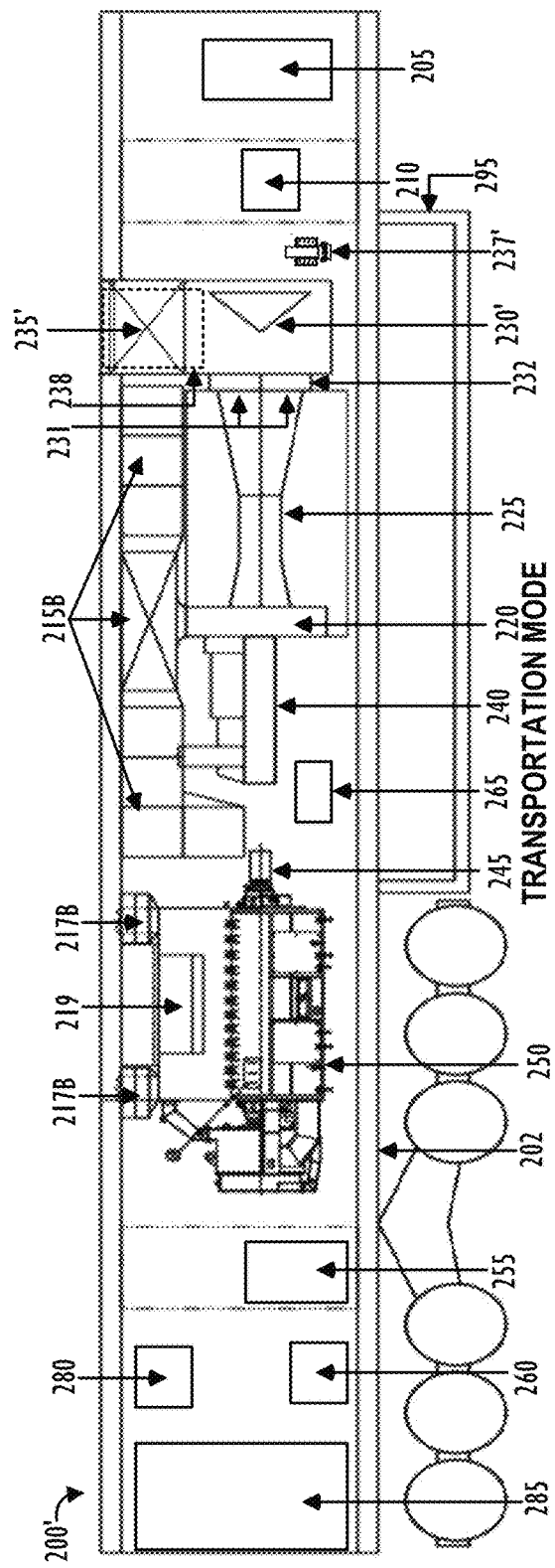
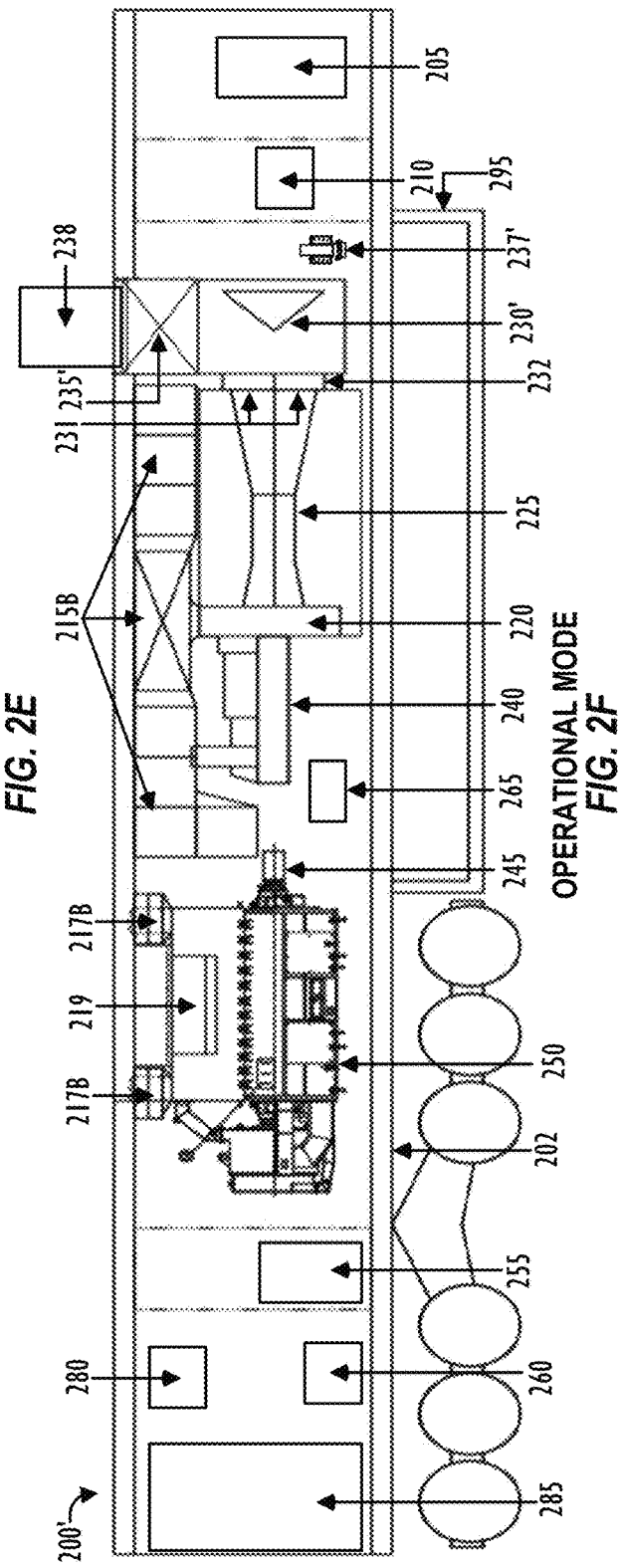
FIG. 2E TRANSPORTATION MODE
FIG. 2F OPERATIONAL MODE

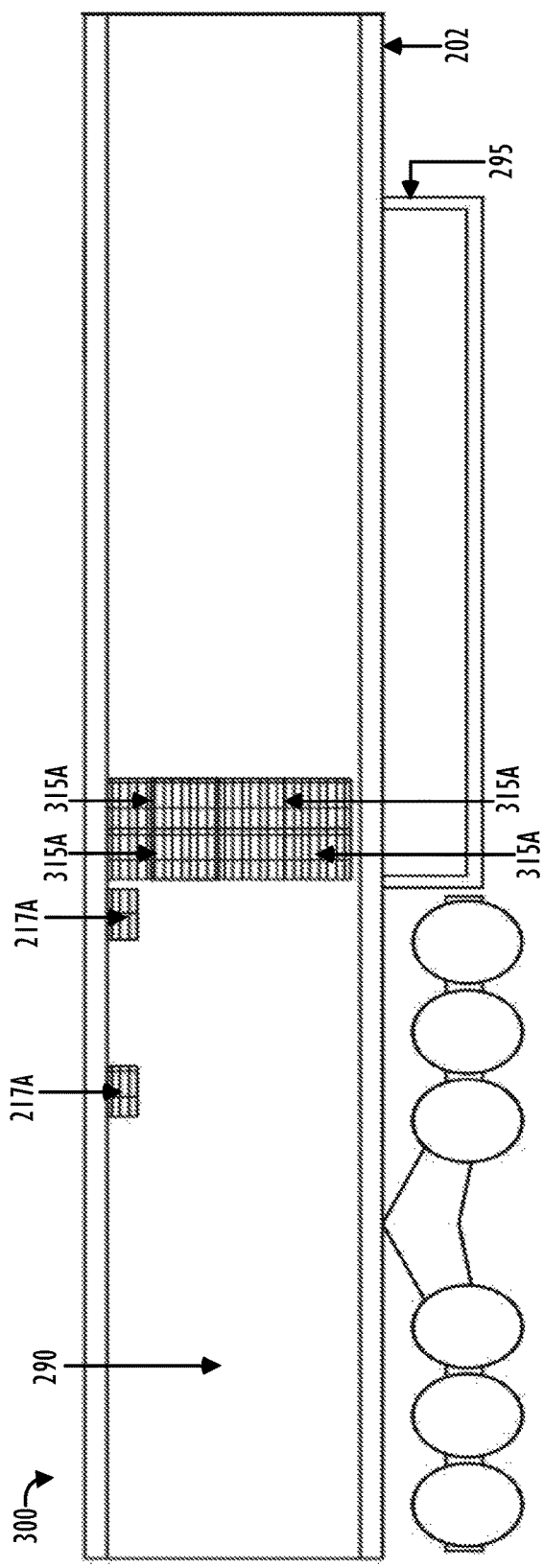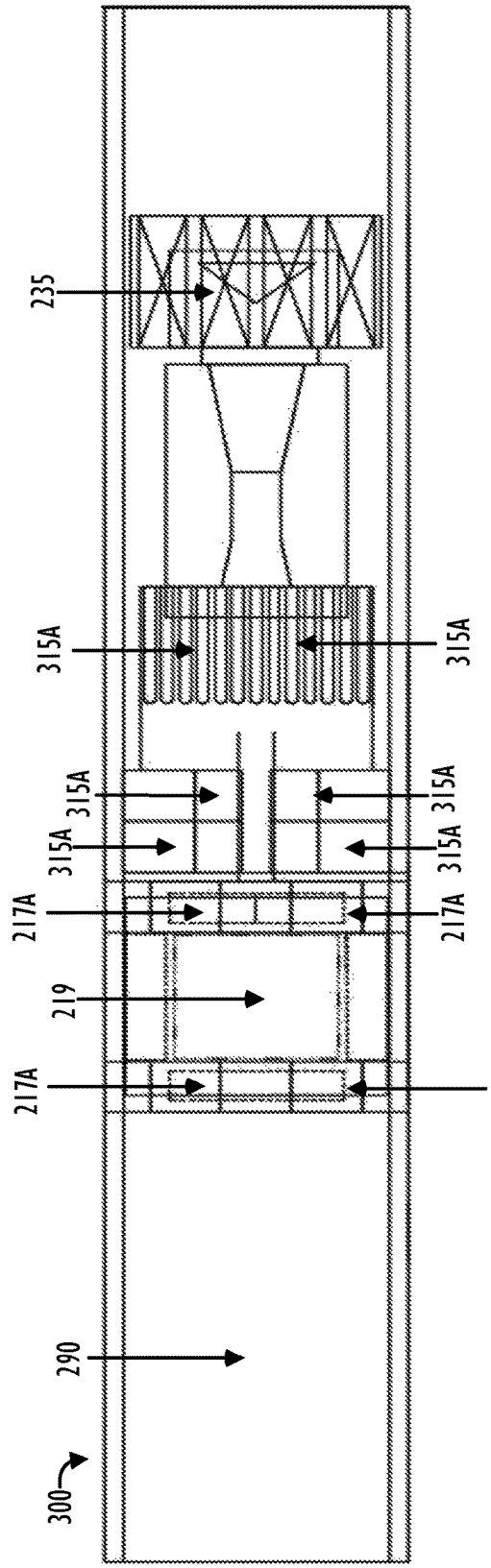

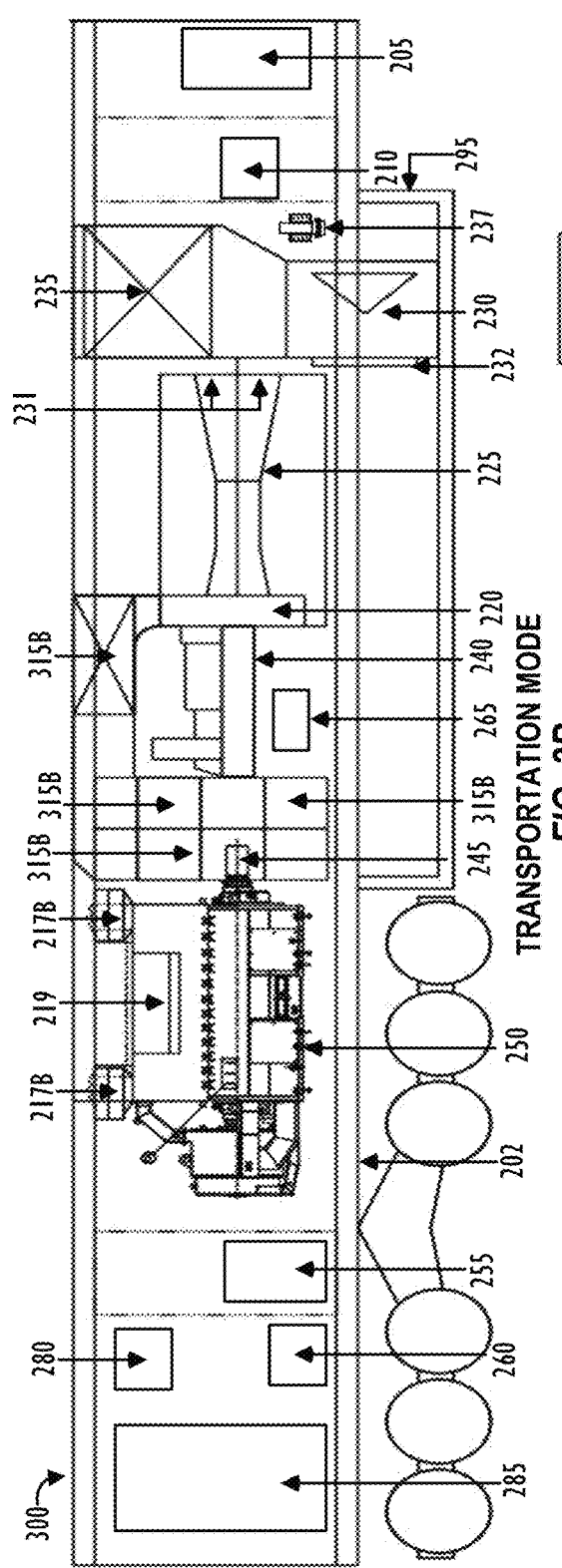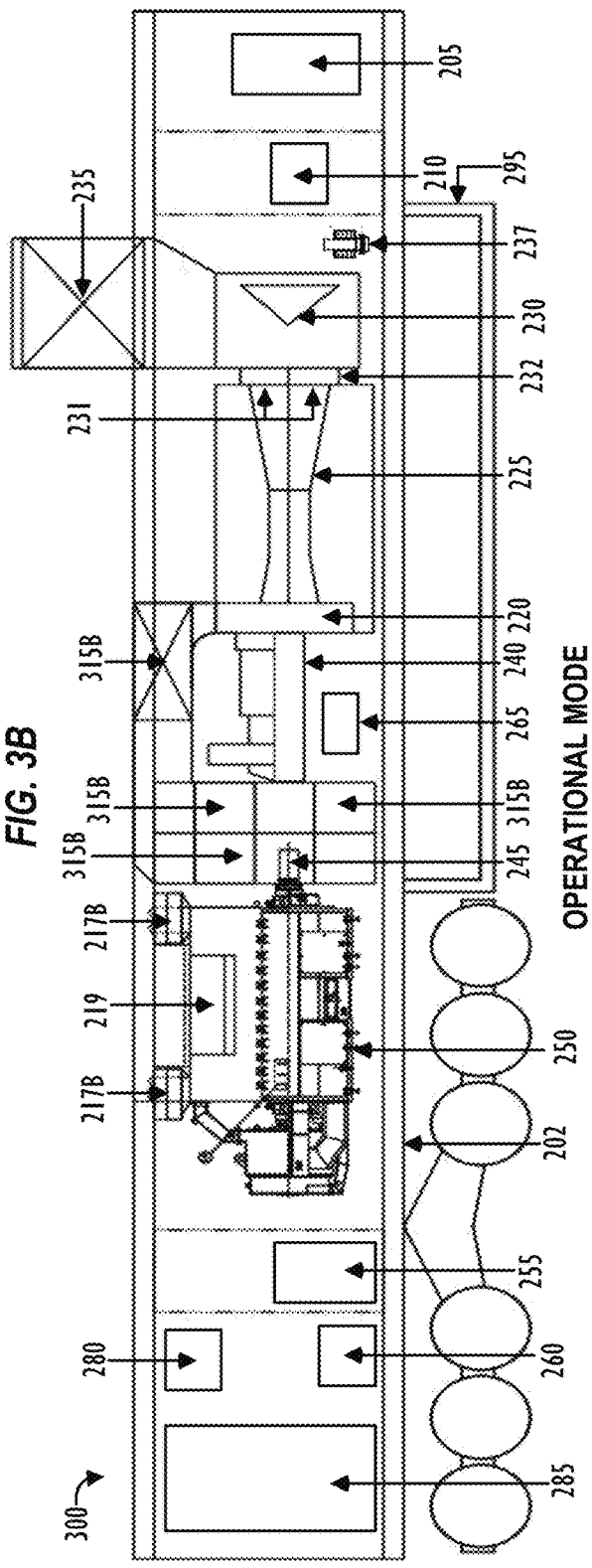
FIG. 3B TRANSPORTATION MODE
FIG. 3C OPERATIONAL MODE

SINGLE-TRANSPORT MOBILE ELECTRIC POWER GENERATION

CROSS-REFERENCE TO RELATED APPLICATION

This application claims the benefit of U.S. Provisional Application No. 62/841,558 filed 1 May 2019, which is incorporated herein by reference in its entirety.

BACKGROUND

Hydraulic fracturing has been commonly used by the oil and gas industry to stimulate production of hydrocarbon wells, such as oil and/or gas wells. Hydraulic fracturing, sometimes called "fracing" or "fracking," is the process of injecting fracturing fluid, which is typically a mixture of water, sand, and chemicals, into the subsurface to fracture the subsurface geological formations and release otherwise encapsulated hydrocarbon reserves. The fracturing fluid is typically pumped into a wellbore at a relatively high pressure sufficient to cause fissures within the underground geological formations. Specifically, once inside the wellbore, the pressurized fracturing fluid is pressure pumped down and then out into the subsurface geological formation to fracture the underground formation. A fluid mixture that may include water, various chemical additives, and proppants (e.g., sand or ceramic materials) can be pumped into the underground formation to fracture and promote the extraction of the hydrocarbon reserves, such as oil and/or gas. For example, the fracturing fluid may comprise a liquid petroleum gas, linear gelled water, gelled water, gelled oil, slick water, slick oil, poly emulsion, foam/emulsion, liquid carbon dioxide, nitrogen gas, and/or binary fluid and acid.

Implementing large-scale fracturing operations at well sites typically require extensive investment in equipment, labor, and fuel. For instance, a typical fracturing operation uses a variety of fracturing equipment, numerous personnel to operate and maintain the fracturing equipment, large amounts of fuel to power the fracturing operations, and large volumes of fracturing fluids. As such, planning for fracturing operations is often complex and encompasses a variety of logistical challenges that include minimizing the on-site area or "footprint" of the fracturing operations, providing adequate power and/or fuel to continuously power the fracturing operations, increasing the efficiency of the hydraulic fracturing equipment, and reducing any environmental impact resulting from fracturing operations. Thus, numerous innovations and improvements of existing fracturing technology are needed to address the variety of complex and logistical challenges faced in today's fracturing operations.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, an apparatus for providing mobile electric power is provided which comprises: a power generation transport including: a generator; a power source configured to drive the generator; an air inlet filter housing; an inlet plenum coupled to the air inlet filter housing, configured for providing air to the power source; an exhaust collector configured for collecting exhaust from the power source; an exhaust implement coupled to the exhaust collector; and an elevating system configured to elevate at least the exhaust implement in an operational mode of the power generation transport, wherein the air inlet filter housing, the inlet plenum, the exhaust collector, the exhaust implement, the power source, the generator, and the elevating system are mounted on the power generation transport.

In another embodiment, a power generation transport is provided which comprises: an air inlet filter housing; an inlet plenum coupled to the air inlet filter housing; a gas turbine; a gearbox coupled to the gas turbine; an exhaust collector adapted to be coupled to an exhaust port of the gas turbine in an operational mode of the power generation transport; an exhaust implement coupled to the exhaust collector; an elevating system configured to elevate at least the exhaust implement in an operational mode; a generator driven by the gas turbine; a gas conditioning system to condition hydrocarbon gas prior to combustion by the gas turbine; a black start generator to provide power to start the gas turbine; and at least one base frame, wherein the at least one base frame mounts and aligns the air inlet filter housing, the inlet plenum, the gas turbine, the exhaust collector, the exhaust implement, the elevating system, the gearbox, the generator, the gas conditioning system, and the black start generator on the power generation transport.

In yet another embodiment, a method for providing mobile electric power is provided which comprises: converting a power generation transport from a transportation mode to an operational mode by elevating an exhaust collector and an exhaust stack mounted on the power generation transport to an elevated standing position; coupling the exhaust collector in the elevated standing position with a gas turbine mounted on the power generation transport, wherein the exhaust collector and the exhaust stack are elevated to the elevated standing position and the exhaust collector is coupled with the gas turbine by an elevating system mounted on the power generation transport, without utilizing any external mechanical apparatus; and operating the gas turbine of the power generation transport in the operational mode to generate electricity.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 2A-2D are schematic diagrams of an embodiment of a power generation transport.

FIGS. 2E-2F are schematic diagrams of another embodiment of the power generation transport.

FIGS. 3A-3D are schematic diagrams of another embodiment of the power generation transport.

Figure 1:
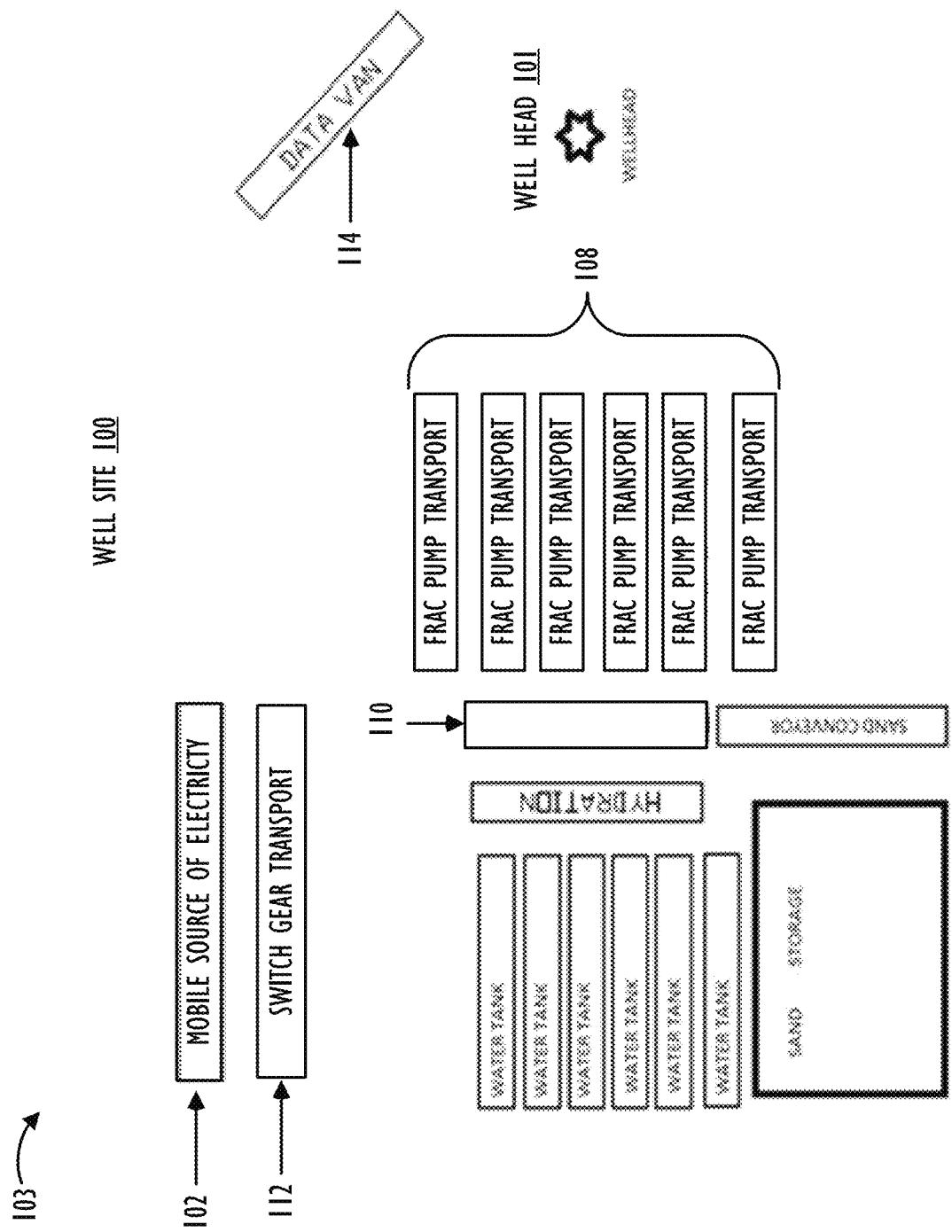
FIG. 1 is a schematic diagram of a mobile fracturing system operating at a well site, in accordance with one or more embodiments.

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

DESCRIPTION

In the following description, for purposes of explanation, numerous specific details are set forth in order to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the invention, and multiple references to "one embodiment" or "an embodiment" or "another embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "transport" refers to any transportation assembly, including, but not limited to, a trailer, truck, skid, and/or barge used to transport relatively heavy structures, such as a mobile gas turbine generator.

As used herein, the term "trailer" refers to a transportation assembly used to transport relatively heavy structures, such as a mobile gas turbine generator that can be attached and/or detached from a transportation vehicle used to pull or move the trailer. In one embodiment, the trailer may include the mounts and manifold systems to connect the trailer to other equipment.

As used herein, the term "lay-down trailer" refers to a trailer that includes two sections with different vertical heights. One of the sections or the upper section is positioned at or above the trailer axles and another section or the lower section is positioned at or below the trailer axles. In one embodiment the main trailer beams of the lay-down trailer may be resting on the ground when in operational mode and/or when uncoupled from a transportation vehicle, such as a tractor.

As used herein, the term "gas turbine generator" refers to both the gas turbine and the generator sections of a gas-turbine generator transport (e.g., power generation transport, power generation trailer). The gas turbine generator receives hydrocarbon fuel, such as natural gas, and converts the hydrocarbon fuel into electricity.

As used herein, the term "inlet plenum" may be interchanged and generally referred to as "inlet", "air intake," and "intake plenum," throughout this disclosure. Additionally, the term "exhaust collector" may be interchanged throughout and generally referred to as "exhaust diffuser" and "exhaust plenum" throughout this disclosure.

As used herein, the term "gas turbine inlet filter" may be interchanged and generally referred to as "inlet filter" and "inlet filter assembly." The term "air inlet filter housing" may also be interchanged and generally referred to as "filter housing" and "air filter assembly housing" throughout this disclosure.

This disclosure pertains to a mobile source of electricity that may be configured to provide electric power for different applications or use cases. The mobile source of electricity may be implemented using a single transport (e.g., single trailer or truck) to reduce its "footprint" at a site. The transport (e.g., power generation transport, gas turbine generator transport, and the like) may comprise a gas turbine and generator along with other equipment to supply electric power for different applications requiring a mobile source of electricity (e.g., at well sites). For example, the power generation transport may comprise a gas conditioning unit, black start generator, gas turbine air inlet filter housing, inlet plenum, gas turbine, exhaust collector, exhaust implement including an exhaust stack and an exhaust stack extension, gearbox, generator, breaker, transformer, control room, control system, elevating system, and additional ancillary equipment to produce electric power, while also reducing footprint of the power generation system by providing required power generation components on a single power generation transport.

The power generation transport may be configured to be 'self-sufficient' such that it can be quickly mobilized and de-mobilized without requiring use of external mechanical means or apparatus. For example, after reaching a remote site where a mobile source of electricity is required, the power generation transport can be quickly converted from a transportation mode to an operational mode by utilizing the elevating system mounted on the power generation transport. The elevating system converts the power generation transport from the transportation mode to the operational mode (without utilizing any external mechanical apparatus) by elevating the exhaust collector and the exhaust stack of the exhaust implement mounted on the power generation transport to an elevated standing position (e.g., upright position), and coupling the exhaust collector in the elevated standing position with the gas turbine mounted on the power generation transport. Alternately, the elevating system may convert the power generation transport to the operational mode by elevating an exhaust stack extension of the exhaust implement to an elevated standing position. In this case, the exhaust stack extension may be mounted to the exhaust stack, and the exhaust stack and the exhaust collector may be fixedly mounted to the base frame of the power generation transport and communicatively coupled to the exhaust port of the gas turbine to release the exhaust.

The gas turbine of the power generation transport may then be operated to generate electricity. After the mobile source of electricity is no longer required at the remote site, the power generation transport can be mobilized to be in the transportation mode by the elevating system by lowering the exhaust stack (or exhaust stack extension) vertically downward to house at least a portion of the exhaust stack within the enclosure of the power generation transport, without use of any external mechanical apparatus.

In the operational mode, the power generation transport may produce electric power in the range of about 1-15 megawatt (MW) (e.g., 5.6 MW). In one embodiment, the power generation transport may be configured such that the inlet (e.g., intake, intake port) of the gas turbine is connected to the air inlet filter housing of an air filter system mounted on the power generation transport, and the exhaust (e.g., outlet, exhaust port) of the gas turbine is detachably connected (e.g., fluidly coupled, aligned, or communicated) to the exhaust stack of the air filter system of the power generation transport.

The mobile source of electricity may have different applications. For example, (one or more instances of) the mobile source of electricity may power mobile electric fracturing operations for one or more well sites by providing electric power to a variety of fracturing equipment located at the well sites. The different fracturing equipment, which include, but are not limited to, a blender, hydration unit, fracturing pump transport, sand handling equipment, chemical additive system, and the mobile source of electricity (e.g., power generation transport), may be configured to operate remotely via a control network system that monitors and controls the fracturing equipment using a network topology, such as an Ethernet ring topology network. The control network system may remove the need for implementing control stations located on and/or in close proximity to the fracturing equipment. Instead, a designated location, such as a data van and/or a remote location away from the vicinity of the fracturing equipment may remotely control the hydraulic fracturing equipment.

In other embodiments, the power generation transport may be implemented to provide electric power for other applications (e.g., industrial, mining, commercial, civilian, agricultural, manufacturing, and the like) where mobile electric power is needed and where the requisite hydrocarbon fuel required to power the power generation transport is available. Although FIG. 1 illustrates the power generation transport being implanted to provide mobile electric power for a hydraulic fracturing application, this may not necessarily be the case. That is, the power generation transport may also be implemented for other oil-and-gas-related, or non-oil-and-gas-related applications where there is a need for a mobile source of electric power.

FIG. 1 is a schematic diagram of an embodiment of well site 100 that comprises wellhead 101 and mobile fracturing system 103. Generally, mobile fracturing system 103 may perform fracturing operations to complete a well and/or transform a drilled well into a production well. For example, well site 100 may be a site where operators are in the process of drilling and completing a well. Operators may start the well completion process with drilling, running production casing, and cementing within the wellbore. The operators may also insert a variety of downhole tools into the wellbore and/or as part of a tool string used to drill the wellbore. After the operators drill the well to a certain depth, a horizontal portion of the well may also be drilled and subsequently encased in cement. The operators may subsequently remove the rig, and mobile fracturing system 103 may be moved onto well site 100 to perform fracturing operations that force relatively high pressure fracturing fluid through wellhead 101 into subsurface geological formations to create fissures and cracks within the rock. Fracturing system 103 may be moved off well site 100 once the operators complete fracturing operations. Typically, fracturing operations for well site 100 may last several days.

To provide an environmentally cleaner and more transportable fracturing fleet, mobile fracturing system 103 may comprise mobile source of electricity 102 configured to power mobile fracturing system 103 or certain components of system 103 by generating electricity by converting hydrocarbon fuel, such as natural gas, obtained from one or more other sources (e.g., a producing wellhead) at well site 100, from a remote offsite location, and/or another relatively convenient location near mobile source of electricity 102. Improving mobility of mobile fracturing system 103 may be beneficial because fracturing operations at a well site typically last for several days and the fracturing equipment is subsequently removed from the well site after completing fracturing operation and moved to another remote location. Further, rather than using fuel that significantly impacts air quality (e.g., diesel fuel) as a source of power and/or receiving electric power from a grid or other type of stationary power generation facility (e.g., located at the well site or offsite), mobile fracturing system 103 utilizes mobile source of electricity 102 as a power source that burns cleaner while being transportable along with other fracturing equipment. The generated electricity from mobile source of electricity 102 may be supplied to fracturing equipment of system 103 to power fracturing operations at one or more well sites, or to other equipment in various types of applications requiring mobile electric power generation. As shown in FIG. 1, mobile source of electricity 102 may be implemented as a single power generation transport or trailer in order to reduce the well site footprint and provide the ability for operators to easily move mobile source of electricity 102 to different well sites and/or different fracturing jobs and/or different physical locations where a mobile source of power is needed.

Configuration of mobile source of electricity 102 is described in more detail in FIGS. 2A-4. Mobile source of electricity 102 is not limited for use in a fracturing operation and may be applicable to power other types of equipment and devices not typically used in a fracturing operation. The use and discussion of FIG. 1 is only an example to facilitate ease of description and explanation of mobile source of electricity 102.

In addition to mobile source of electricity 102, mobile fracturing system 103 may include switch gear transport 112, at least one blender transport 110, at least one data van 114, and one or more fracturing pump transports 108 that deliver fracturing fluid through wellhead 101 to subsurface geological formations. Switch gear transport 112 may receive electricity generated from mobile source of electric power 102 via one or more electrical connections. In one embodiment, switch gear transport 112 may use 13.8 kilovolts (kV) electrical connections to receive power from mobile source of electricity 102. Switch gear transport 112 may comprise a plurality of electrical disconnect switches, fuses, transformers, and/or circuit protectors to protect the fracturing equipment. The switch gear transport 112 may transfer the electricity received from the mobile source of electricity 102 to the electrically connected fracturing equipment of mobile fracturing system 103. Switch gear transport 112 may further comprise a control system to control, monitor, and provide power to the electrically connected fracturing equipment.

In one embodiment, switch gear transport 112 may receive a 13.8 kV electrical connection and step down the voltage to 4.8 kV, which is provided to other fracturing equipment, such as fracturing pump transport 108, blender transport 110, sand storage and conveyor, hydration equipment, chemical equipment, data van 114, lighting equipment, and any additional auxiliary equipment used for the fracturing operations. Switch gear transport 112 may step down the voltage to 4.8 kV rather than other voltage levels, such as 600 V, in order to reduce cable size for the electrical connections and the amount of cabling used to connect mobile fracturing system 103. The control system may be configured to connect to a control network system such that switch gear transport 112 may be monitored and/or controlled from a distant location, such as data van 114 or some other type of control center. Alternately, switch gear transport 112 may simply pass through the higher voltage (e.g., 13.8 kV) to downstream equipment (e.g., frac pump transport 108), and the downstream equipment may include one or more transformers to perform any voltage step down operations (e.g., convert 13.8 kV voltage to lower voltage levels like 4.8 kV, 600 V, and the like) to power downstream frac equipment. The amount of cabling between switch gear transport 112 and downstream equipment can be reduced by performing the voltage step down operation further downstream.

Fracturing pump transport 108 may receive the electric power from switch gear transport 112 to power a prime mover. The prime mover converts electric power to mechanical power for driving one or more pumps. In one embodiment, the prime mover may be a dual shaft electric motor that drives two different pumps. Fracturing pump transport 108 may be arranged such that one pump is coupled to opposite ends of the dual shaft electric motor and avoids coupling the pumps in series. By avoiding coupling the pump in series, fracturing pump transport 108 may continue to operate when either one of the pumps fails or have been removed from fracturing pump transport 108. Additionally, repairs to the pumps may be performed without disconnecting the system manifolds that connect fracturing pump transport 108 to other fracturing equipment within mobile fracturing system 103 and wellhead 101.

Blender transport 110 may receive electric power fed through switch gear transport 112 to power a plurality of electric blenders. A plurality of prime movers may drive one or more pumps that pump source fluid and blender additives (e.g., sand) into a blending tub, mix the source fluid and blender additives together to form fracturing fluid, and discharge the fracturing fluid to fracturing pump transport 108. In one embodiment, the electric blender may be a dual configuration blender that comprises electric motors for the rotating machinery that are located on a single transport, which is described in more detail in U.S. Pat. No. 9,366,114, filed Apr. 6, 2012 by Todd Coli et al. and entitled "Mobile, Modular, Electrically Powered System for use in Fracturing Underground Formations," which is herein incorporated by reference in its entirety. In another embodiment, a plurality of enclosed mixer hoppers may be used to supply the proppants and additives into a plurality of blending tubs.

Data van 114 may be part of a control network system, where data van 114 acts as a control center configured to monitor and provide operating instructions to remotely operate blender transport 110, mobile source of electricity 102, and fracturing pump transport 108 and/or other fracturing equipment within mobile fracturing system 103. For example, data van 114 may communicate via the control network system with the variable frequency drives (VFDs) located within system 103 that operate and monitor the health of the electric motors used to drive the pumps on fracturing pump transports 108. In one embodiment, data van 114 may communicate with the variety of fracturing equipment of system 103 using a control network system that has a ring topology. A ring topology may reduce the amount of control cabling used for fracturing operations and increase the capacity and speed of data transfers and communication.

Other fracturing equipment shown in FIG. 1, such as water tanks, chemical storage of chemical additives, hydration unit, sand conveyor, and sandbox storage are known by persons of ordinary skill in the art, and therefore are not discussed in further detail. In one or more embodiments of mobile fracturing system 103, one or more of the other fracturing equipment shown in FIG. 1 may be configured to receive power generated from mobile source of electricity 102. The control network system for mobile fracturing system 103 may remotely synchronize and/or slave the electric blender of blender transport 110 with the electric motors of fracturing pump transports 108. Unlike a conventional diesel-powered blender, the electric blenders may perform rate changes to the pump rate change mounted on fracturing pump transports 108. In other words, if the pumps within fracturing pump transports 108 perform a rate change increase, the electric blender within blender transport 110 may also automatically compensate its rate and ancillary equipment, such as the sand conveyor, to accommodate the rate change. Manual commands from an operator may not be used or needed to perform the rate change.

Mobile source of electricity 102 may be a part of mobile fracturing system 103 used at well site 101 as described in FIG. 1. Alternately, mobile source of electricity 102 may be a part of another system that utilizes mobile electric power generated by the power generation transport for operating electrical equipment. The mobile source of electricity may be configured to be transportable to different locations. For example, in case the mobile source of electricity is part of the mobile fracturing system, the mobile source of electricity may be configured to be transportable to different well sites along with other equipment (e.g., fracturing pump transports) that is part of the mobile fracturing system and may not be left behind after completing fracturing operations.

Regardless of the application, the mobile source of electricity may include a power generation transport that is configured as a single transport that improves mobility by simplifying and minimizing operations for the mobilization and de-mobilization process. For example, the mobile source of electricity may improve mobility by enabling a mobilization and de-mobilization time period of about 24 hours. The mobile source of electricity incorporates a single transport footprint, where the same transport may be used in transportation and operational modes, and be configured as a 'self-sufficient' transport that carries all ancillary equipment for mobile electric power generation. To provide electric power at one or more locations (e.g., well sites), the mobile source of electricity may be designed to unitize and mobilize a gas turbine and a generator adapted to convert hydrocarbon fuel, such as natural gas, into electricity. Although FIGS. 2A-3D illustrate embodiments of implementing a mobile source of electricity using a single transport, other embodiments of the mobile source of electricity may mount some of the ancillary components shown in FIGS. 2A-3D on a separate transport, without departing from the spirit or scope of the present disclosure.

FIGS. 2A-2D are schematic diagrams of an embodiment of power generation transport 200 (e.g., gas turbine generator transport, mobile source of electricity 102, and the like). FIG. 2A illustrates a side-profile view of power generation transport 200 with enclosure 290 that surrounds components within power generation transport 200 and that includes cavities for generator air inlets 217A for drawing air into enclosure 290 for ventilation and cooling of a generator housed in enclosure 290, and cavities (e.g., openings) for turbine air inlets 215A for drawing air into enclosure 290 for combustion by a gas turbine housed in enclosure 290 and for ventilating enclosure 290.

FIG. 2B illustrates a side-profile view of power generation transport 200 that depicts components within enclosure 290, while power generation transport 200 is in a transportation mode. As shown in FIG. 2B, power generation transport 200 may comprise the following equipment: gas conditioning skid 205, black start generator 210, power source 225, power source air inlet filter housing 215B, power source inlet plenum 220, power source exhaust collector 230, exhaust coupling member 232, power source exhaust stack 235 (e.g., exhaust implement), gearbox 240, generator shaft 245, generator 250, generator air inlet filter housing 217B, generator ventilation outlet 219, generator breaker 255, transformer 260, starter motor 265, control system 280, and control room 285. Other components not shown in FIG. 2B, but which may also be located on power generation transport 200 include a turbine lube oil system, a fire suppression system, a generator lube oil system, and the like. In one embodiment, power source 225 may be a gas turbine. In another embodiment, power source 225 may be another type of power source (e.g., diesel engine). Power source 225 is hereinafter referred to interchangeably as gas turbine 225. However, as stated above, power source 225 may correspond to other types of turbine or non-turbine-based power sources that are capable of generating sufficient mechanical energy.

Gas turbine 225 may be a General Electric (GE) NovaLT5 turbine to generate mechanical energy (e.g., rotation of a shaft) from a hydrocarbon fuel source, such as natural gas, liquefied natural gas, condensate, and/or other liquid fuels. As shown in FIG. 2B, a shaft (not shown) of gas turbine 225 is connected to gearbox 240 and shaft 245 of generator 250 such that generator 250 converts the supplied mechanical energy from the rotation of shaft 245 to produce electric power. Gas turbine 225 may be a commercially available gas turbine such as a General Electric NovaLT5 gas turbine, a Pratt and Whitney gas turbine, or any other similar gas turbine. Generator 250 may be a commercially available generator such as a Brush generator, a WEG generator, or other similar generator configured to generate a compatible amount of electric power. For example, the combination of gas turbine 225, gearbox 240, and generator 250 within power generation transport 200 may generate electric power from a range of at least about 1 megawatt (MW) to about 15 MW (e.g., 5.6 MW). Other types of gas turbine/generator combinations with power ranges greater than about 15 MW or less than about 1 MW may also be used depending on the application requirement. In one embodiment, to increase mobility of power generation transport 200 and so that power generation transport 200 can be configured as a single transport, gas turbine 225 may be configured to fit within a dimension of about 14.5 feet long and about 4 feet in diameter and/or generator 250 may be configured to fit within a dimension of about 18 feet long and about 7 feet wide.

Generator 250 may be housed within enclosure 290 that includes air ventilation fans internal and/or external to generator 250 that draw air into air inlets 217A (FIGS. 2A and 2D) located on the sides and/or top roof of enclosure 290, provide the drawn air to cool generator 250 via generator air inlet filter housing 217B including one or more air inlet filters, and discharge air out on the top and/or sides of enclosure 290 via generator ventilation air outlet 219. Transport 200 may include appropriate ducts, piping, conduits or other structure to communicatively couple air inlets 217A and air inlet filter housing 217B with a cooling surface or an external surface of generator 250 for cooling and ventilation, and to further communicatively couple the cooling and/or external surface of generator 250 with air outlet 219. As shown in FIGS. 2A and 2D, air inlets 217A and air outlet 219 may be provided so as to be flush with the outer surface (e.g., longitudinal side surfaces and/or top or roof surface) of enclosure 290 of transport 200. Other embodiments may have outlet 219 positioned on different locations of enclosure 290. In one embodiment, generator air inlets 217A may be inlet louvres and generator ventilation outlets 219 may be outlet louvres that protect the generator from weather elements. A separate generator ventilation stack unit may be mounted on the top and/or side of enclosure 290 power generation transport 200.

Enclosure 290 may also comprise gas turbine inlet filter housing 215B including one or more air inlet filters configured to provide combustion air via one or more inlet plenums 220 to gas turbine 225. Gas turbine inlet filter housing 215B may also be configured to provide ventilation air to ventilate an interior of enclosure 290. Although not shown in FIGS. 2A-2D, ventilation fans may also be located within gas turbine inlet filter housing 215B. Additional enclosure 290 ventilation inlets may be added to increase the amount of ventilation air. The ventilation air may also be used to cool gas turbine 225 in the operational mode. The combustion air may be air that is supplied to an intake port of gas turbine 225 via inlet plenum 220 to aid in the production of the mechanical energy. Inlet plenum 220 may be configured to collect the filtered intake air from gas turbine inlet filter housing 215B and supply the intake air to the intake port of gas turbine 225.

In one embodiment, gas turbine inlet filter housing 215B may be mounted on enclosure 290 and fixedly positioned to be aligned with and coupled to inlet plenum 220 to provide combustion air to the intake port of gas turbine 225. Gas turbine air inlet filter housing 215B may also comprise a plurality of silencers to reduce noise. As shown in FIGS. 2A-2D, air inlets 215A are provided so as to be flush with the side and/or top surface of enclosure 290 of power generation transport 200. Air inlets 215A are aligned and communicated with an intake or opening of gas turbine air inlet filter housing 215B to filter and flow the combustion air and ventilation air to an interior of enclosure 290.

As shown in FIGS. 2B and 2C, exhaust collector 230 may be configured to be detachably coupled to an exhaust port 231 (e.g., outlet port) of gas turbine 225 to collect exhaust air and supply the exhaust air to gas turbine exhaust stack 235 (e.g., exhaust implement). The embodiment shown in FIGS. 2B-2C illustrates exhaust stack 235 as being vertically coupled so as to be stacked on top of exhaust collector 230 (i.e., exhaust stack 235 positioned on top of exhaust collector 230). However, this may not necessarily be the case. Any suitable arrangement and coupling between exhaust collector 230 and exhaust stack 235 may be employed so that exhaust collector 230 and exhaust stack 235 may be housed within dimensions of power generation transport 200 (including dimensions of underbelly truss or skid 295) during the transportation mode (FIG. 2B). Gas turbine exhaust stack 235 may comprise a plurality of silencers that reduce noise from power generation transport 200 during operation.

During operation (i.e., when gas turbine generator transport 200 is in an operational mode), as shown in FIG. 2C, one or both of exhaust collector 230 and exhaust stack 235 may be configured to be jacked up (e.g., using hydraulics) by a predetermined vertical distance to an elevated standing position. Further, to improve mobility of power generation transport 200 during transportation (i.e., when gas turbine generator transport 200 is in a transportation mode), as shown in FIG. 2B, one or both of exhaust collector 230 and exhaust stack 235 may be configured to be jacked down (e.g., using hydraulics) by the predetermined vertical distance so that a top surface of exhaust stack 235 becomes flush with the top or roof of enclosure 290 of transport 200.

To jack one or both of exhaust collector 230 and exhaust stack 235 up and down (e.g., raise and lower exhaust collector 230 and exhaust stack 235), power generation transport 200 may include elevating system 237 that changeably adjusts the positioning and alignment of exhaust collector 230 and/or exhaust stack 235 so that the exhaust air outlet port 231 of gas turbine 225 can be aligned with and coupled to exhaust collector 230 via exhaust coupling member 232. In one embodiment, elevating system 237 may be a hydraulic system. Alternately, elevating system 237 may be implemented using an electric motor, rack-and-pinion system, pneumatic system, pulley-based system, and the like. For example, elevating system 237 may vertically move (e.g., raise, lift, elevate and the like) exhaust collector 230 and/or exhaust stack 235 to an elevated standing position such that exhaust coupling member 232 of exhaust collector 230 becomes aligned with the exhaust port 231 of gas turbine 225, without attaching exhaust collector and/or exhaust stack 235 to an external apparatus (e.g., a tractor or other type of motor vehicle, external mechanical means, external mechanical apparatus, crane, and the like). Elevating system 237 may comprise a plurality of hydraulic cylinders and/or support feet used to support exhaust collector 230 and exhaust stack 235 vertically and/or horizontally. For example, elevating system 237 may comprise a first member (e.g., hydraulic cylinder) that elevates or raises exhaust collector 230 and/or exhaust stack 235 vertically to an elevated standing position, and aligns coupling member 232 of exhaust collector 230 with the exhaust port 231 of gas turbine 225, and a second member (e.g., hydraulic cylinder) that moves exhaust collector 230 (and optionally, exhaust stack 235) in a lateral or horizontal direction to connect or communicate coupling member 232 of exhaust collector 230 with the exhaust port 231 of gas turbine 225.

As shown in FIG. 2B, exhaust collector 230 and exhaust stack 235 may be mounted to initially stack lower vertically during transportation mode, such that the top of exhaust stack 235 is flush with the roof of enclosure 290 of transport 200. In the operational mode shown in FIG. 2C, exhaust collector 230 and exhaust stack 235 may be raised up vertically without using any external mechanical means or apparatus by elevating system 237. In the operational mode, exhaust collector 230 and gas turbine exhaust stack 235 may be positioned using hydraulics, pneumatics, and/or electric motors and pulleys such that gas turbine exhaust collector 230 aligns with and couples to the exhaust port 231 of gas turbine 225 via coupling member 232. In one embodiment, elevating system 237 may vertically move (e.g., raise, extend, or lift) exhaust collector 230 and/or exhaust stack 235 by a predetermined vertical distance (e.g., around four feet) when setting up power generation transport 200 for operation in the operational mode. As shown in FIG. 2C, in the operational mode, exhaust stack 235 may thus extend vertically upward and out of a top side of enclosure 290 by around four feet, thereby reducing exhaust noise and safely releasing (extremely hot) exhaust air into the atmosphere without posing danger to any equipment and/or an operator working in a vicinity of power generation transport 200. Further, as shown in FIG. 2B, in the transportation mode, elevating system 237 may safely lower exhaust stack 235 back down so that exhaust coupling member 232 of exhaust collector 230 is decoupled from the air outlet of gas turbine 225, and exhaust collector 230 and exhaust stack 235 are vertically lowered by a predetermined vertical distance (e.g., around four feet) so as to extend down (e.g., lower) and be housed by enclosure 290. As shown in FIG. 2B, when in the transportation mode, at least a portion of exhaust collector 230 may also extend below base frame 202 (e.g., the floor, and the like) of enclosure 290 so as to be supported by underbelly truss or skid 295 that extends below base frame 202 of enclosure 290.

As explained above, in the operational mode shown in FIG. 2C, exhaust collector 230 may connect with the exhaust port 231 of gas turbine 225 via exhaust coupling member 232. Exhaust coupling member 232 may include one or more connection or coupling members that are provided fixedly on one or both of exhaust collector 230 and the exhaust port 231 of gas turbine 225. Any form of connection may be used that provides coupling between gas turbine 225 and exhaust collector 230 without using a crane, forklift, and/or any other external mechanical means to connect the connection members in place and/or to connect coupling member 232 of exhaust collector 230 to the exhaust port 231 of gas turbine 225. The connection members may comprise a duct and/or an expansion joint or a connection joint to matingly connect exhaust collector 230 to gas turbine 225. Thus, exhaust coupling member 232 may move and connect (e.g., using elevating system 237 and/or other actuator) to the exhaust port 231 of gas turbine 225 without using any external mechanical means.

In the embodiment shown in FIGS. 2B and 2C, exhaust collector 230 and exhaust stack 235 disposed on base frame 202 of power generation transport 200 are movable relative to the fixedly mounted gas turbine 225. That is, exhaust collector 230 and exhaust stack 235 are adapted to be jacked up and down by a predetermined vertical distance by using elevating system 237 to couple/decouple exhaust collector 230 to/from the exhaust port 231 of gas turbine 225. However, in another embodiment, exhaust collector 230 and exhaust stack 235 may be fixedly mounted on base frame 202 and coupled with the exhaust port 231 of gas turbine 225 to release exhaust air. As shown in FIGS. 2E-2F, power generation transport 200' may include exhaust collector 230' disposed on base frame 202 and fixedly mounted to the exhaust port 231 of gas turbine 225, and exhaust stack 235' may be disposed on base frame 202 and fixedly mounted to exhaust collector 230' such that a top portion or surface of exhaust stack 235' is flush with the top or roof of enclosure 290 (FIGS. 2E and 2F) in both the transportation and operational modes. In this embodiment, in order to safely release the hot exhaust air into the atmosphere from exhaust stack 235', power generation transport 200' may further include exhaust stack extension 238 (e.g., exhaust implement) that is housed within exhaust stack 235' in the transportation mode (FIG. 2E) and that is configured to be raised or elevated from within exhaust stack 235' in the operational mode (FIG. 2F) by elevating system 237'.

Exhaust collector 230' may be fixedly mounted to base frame 202 of power generation transport 200' and communicatively coupled to the exhaust port 231 of gas turbine 225 via exhaust coupling member 232 to collect exhaust air and supply the exhaust air to gas turbine exhaust stack 235'. Exhaust stack 235' may be fixedly mounted to base frame 202 and vertically coupled so as to be stacked on top of exhaust collector 230' (i.e., exhaust stack 235' positioned on top of exhaust collector 230') and so that the top of exhaust stack 235' is flush with the roof of enclosure 290. With this configuration, exhaust collector 230' and exhaust stack 235' may be fixedly mounted and housed within dimensions of power generation transport 200 during both the transportation mode (FIG. 2E) and the operational mode (FIG. 2F).

During operation (i.e., when gas turbine generator transport 200' is in an operational mode), as shown in FIG. 2F, exhaust stack extension 238 (e.g., exhaust implement) may be configured to be raised (e.g., using hydraulics) by a predetermined vertical distance to an elevated standing position. Exhaust stack extension 238 may be configured to extend vertically from within exhaust stack 235' by operating elevating system 237' disposed on power generation transport 200'. Exhaust stack extension 238 may be raised up vertically by elevating system 237' without using any external mechanical means or apparatus.

Exhaust stack extension 238 may be configured for noise control. For example, exhaust stack extension 238 may comprise a plurality of silencers that reduce noise from power generation transport 200' during operation. Exhaust stack extension 238 may be mounted to exhaust stack 235' and disposed on power generation transport 200' so as to be housed within exhaust stack 235' during the transportation mode (FIG. 2E) and so that the top of exhaust stack extension 238 is flush with the top or roof of enclosure 290. In the operational mode, exhaust stack extension 238 may be positioned by elevating system 237' such that exhaust stack extension 238 raises from within the fixedly mounted exhaust stack 235' and an air intake end of exhaust stack extension 238 becomes flush with the roof of enclosure 290 and the air exhaust end of exhaust stack extension 238 projects out of the top of enclosure 290 by a predetermined vertical distance (e.g., around four feet). Exhaust stack extension 238 may thus extend vertically upward and out of a top side of enclosure 290 by around four feet, thereby reducing exhaust noise and safely releasing (extremely hot) exhaust air into the atmosphere without posing danger to any equipment and/or an operator working in a vicinity of power generation transport 200'. Further, as shown in FIG. 2E, in the transportation mode, elevating system 237' may safely lower exhaust stack extension 238 back down by a predetermined vertical distance (e.g., around four feet) so as to extend down (e.g., lower) and be housed within enclosure 290. Exhaust stack extension 238 may thus be housed within an interior of exhaust stack 235' so that the air exhaust end of exhaust stack extension 238 becomes flush with the top or roof of enclosure 290.

As shown in FIGS. 2A-2F, by adapting air inlet filter housing 215B and gas turbine exhaust stack 235, 235' to be mounted on the same/single transport or frame 202 as the transport or frame 202 for inlet plenum 220, gas turbine 225, exhaust collector 230, and generator 250, power generation transport 200, 200' provides a relatively quick rig-up and/or rig-down time that eliminates the use of heavy lift cranes, forklifts, and/or any other external mechanical means or apparatus at the operational site. To improve mobility over a variety of roadways, power generation transport 200, 200' in FIGS. 2A-2F may have a maximum height of about 13 feet and 6 inches, a maximum width of about 8 feet and 6 inches, and a maximum length of about 70 feet. Further, power generation transport 200, 200' may comprise at least three axles used to support and distribute the weight on power generation transport 200, 200'. Other embodiments of power generation transport 200, 200' may be transports that exceed three axles depending on the total transport weight.

The dimensions and the number of axles may be adjusted to allow for transport over roadways that typically mandate certain height, length, and weight restrictions.

In one embodiment, gas turbine 225, gearbox 240, generator 250, and other components of power generation transport 200, 200' shown in FIGS. 2B-2F may be supported on power generation transport 200, 200' by being mounted on engineered base frame 202, a sub-base, sub-skid, or any other sub-structure of power generation transport 200, 200'. For example, base frame 202 may mount and align air inlet filter housing 215B, inlet plenum 220, gas turbine 225, exhaust collector 230, 230', exhaust stack 235, 235', exhaust stack extension 238, elevating system 237, 237', gearbox 240, generator 250, gas conditioning system 205, and black start generator 210 on power generation transport 200, 200', 300. Further, the single engineered base frame 202 may be used to mount and to align the connections between gas turbine 225, gearbox 240, generator 250, inlet plenum 220, and exhaust collector 230, 230' and/or to lower gas turbine 225, gearbox 240, and generator 250 by configuring for a flush mount to single engineered base frame 202. Engineered base frame 202 may allow for easier alignment and connection of gas turbine 225, gearbox 240, generator 250, and other components of power generation transport 200, 200' compared to using a separate sub-base for gas turbine 225 and generator 250. Other embodiments of power generation transport 200, 200' may use a plurality of sub-bases so as to, for example, mount gas turbine 225 and gearbox 240 on one sub-base and mount generator 250 on another sub-base.

FIGS. 2B-2F further illustrate that gas conditioning skid 205, black start generator 210, generator breaker 255, transformer 260, starter motor 265, control system 280, and control room 285 may be located on power generation transport 200, 200' (e.g., mounted on base frame 202). Gas conditioning skid 205 (e.g., gas conditioning unit or system) may be adapted to receive hydrocarbon gas (e.g., natural gas) from a hydrocarbon fuel source (e.g., a gas pipeline). Gas conditioning skid 205 may include a gas conditioning system that regulates hydrocarbon gas pressures, heats the hydrocarbon gas, separates out liquids from the hydrocarbon gas (e.g., water), and/or filters out unwanted contaminants (e.g., sand) from the hydrocarbon gas. Gas conditioning skid 205 may also include a compression system that utilizes an electric motor to drive one or more compressors to compress the hydrocarbon gas to a designated pressure (e.g., about 525 pounds per square inch (PSI)). Gas conditioning skid 205 may subsequently output the processed hydrocarbon gas to a gas storage system that siphons a portion of the processed hydrocarbon gas to fill one or more gas storage tanks (not shown). Prior to storing the processed hydrocarbon gas within the gas storage tanks, the gas storage system may further compress the hydrocarbon gas to a relatively higher pressure level (e.g., about 3,000 PSI or 5,000 PSI). The remaining portion of the processed hydrocarbon gas bypasses any additional processing by gas conditioning skid 205 and may be directly output to gas turbine 225 for electric power generation. When the pressure of the hydrocarbon gas received by the compression system of gas conditioning skid 205 starts to drop below a predetermined backup pressure (e.g., about 500 PSI), the gas storage system of skid 205 may release the hydrocarbon gas stored within the gas storage tanks so as to output hydrocarbon gas that is free of contaminants to gas turbine 225 at a regulated and acceptable pressure level.

Black start generator 210 may be configured to provide power to control, ignite, or start gas turbine 225. In addition, black start generator 210 may provide ancillary power where peak electric power demand exceeds the electric power output of power generation transport 200, 200'. Black start generator 210 may comprise a diesel generator that may provide testing, standby, peaking, and/or other emergency backup power functionality for power generation transport 200, 200' or other equipment powered by power generation transport 200, 200'. Generator breaker 255 may comprise one or more circuit breakers that are configured to protect generator 250 from current and/or voltage fault conditions. Generator breaker 255 may be a medium voltage (MV) circuit breaker switchboard. In one embodiment, generator breaker 255 may include three panels, two for generator 250 and one for a feeder that protect relays on the circuit breaker. Other embodiments may include one or two or more than three panels for generator breaker 255. In one embodiment, generator breaker 255 may be a vacuum circuit breaker.

Transformer 260 may be a step-down transformer that is configured to lower generator 250 voltage to a lower voltage to provide control power to power generation transport 200. Gearbox 240 is provided to reduce the turbine output rpm to the operational rpm of the generator. The starter motor 265 can be an electric motor coupled to the gearbox and/or turbine to start the turbine. Control system 280 may be configured to control, monitor, regulate, and adjust power output of gas turbine 225 and generator 250. For example, in the embodiment where power generation transport 200, 200' is implemented to provide power for a hydraulic fracturing operation at a well site, control system 280 may monitor and balance the load produced by the fracturing operations by generating enough electric power to match the load demands. Similarly, in other applications (other than hydraulic fracturing), control system 280 may monitor and balance the load produced by the power consuming system or equipment, and generate electric power to match load demands. Control system 280 may also be configured to synchronize and communicate with a control network system that allows a data van or other computing systems located in a remote location (e.g., off a well site) to control, monitor, regulate, and adjust power output of generator 250. The control room 285 is the section of power generation transport 200 that houses all the electronics and controls of generator 250.

Although FIGS. 2B-2F illustrate that gas conditioning skid 205, black start generator 210, generator breaker 255, transformer 260, starter motor 265, control system 280, and control room 285 may be mounted on base frame 202 of power generation transport 200, 200', other embodiments of power generation transport 200 may mount one or more of gas conditioning skid 205, black start generator 210, generator breaker 255, transformer 260, starter motor 265, control system 280, and control room 285 in other locations (e.g. switch gear transport 112).

Other equipment that may also be located on power generation transport 200, 200', but not shown in FIGS. 2A-2F include the turbine lube oil system, gas fuel valves, generator lube oil system, gearbox lube oil system, and fire suppression system. The lube oil systems or consoles, which generally refer to both the turbine lube oil system, gearbox lube oil system, landing & leveling legs and associated hydraulics and generator lube oil system within this disclosure, may be configured to provide a generator lube oil filtering and cooling system and a turbine lube oil filtering and cooling system. In one embodiment, the turbine lube oil console area of the transport may also contain the fire suppression systems, which may comprise sprinklers, water mist, clean agent, foam sprinkler, carbon dioxide, and/or other equipment used to suppress a fire or provide fire protection for gas turbine 225. The mounting of the turbine, gearbox & generator lube oil consoles and the fire suppression system onto power generation transport 200, 200' reduces this transport's footprint by eliminating the need for an auxiliary transport and connections for the turbine, gearbox and generator lube oil, filtering, cooling systems and the fire suppression systems to the gas turbine generator transport. The turbine, gearbox, and generator lube oil systems may be mounted on a skid that is located underneath generator 250 or any other location on power generation transport 200, 200'.

In the embodiment shown in FIGS. 2A-2F, gas turbine air inlets 215A and air inlet filter housing 215B are mounted along a top surface of enclosure 290 (FIG. 2D) so that inlets 215A and filter housing 215B extend substantially horizontally above gearbox 240 and gas turbine 225. However, the number and arrangement of inlets 215A, filters, and filter housing 215B is not limiting. Any number or arrangement of inlets 215A, filters, and/or filter housing 215B may be employed depending on, e.g., the volume of ventilation air required, the amount of clean air and the air flow dynamics needed to supply combustion air to gas turbine 225, and the like. An alternate embodiment of power generation transport 300 is shown in FIGS. 3A-3D. Power generation transport 300 shown in FIGS. 3A-3D is similar to power generation transport 200 shown in FIGS. 2A-2F except that the arrangement of gas turbine air inlets 315A and gas turbine inlet filter housing 315B is different. As shown in FIGS. 3A-3D, gas turbine air inlets 315A and gas turbine inlet filter housing 315B extend substantially vertically between gas turbine 225 and generator 250. Since other components of power generation transport 300 is shown in FIGS. 3A-3D are the same as those of power generation transport 200, 200' of FIGS. 2A-2F, detailed description thereof is omitted here.

Figure 4:
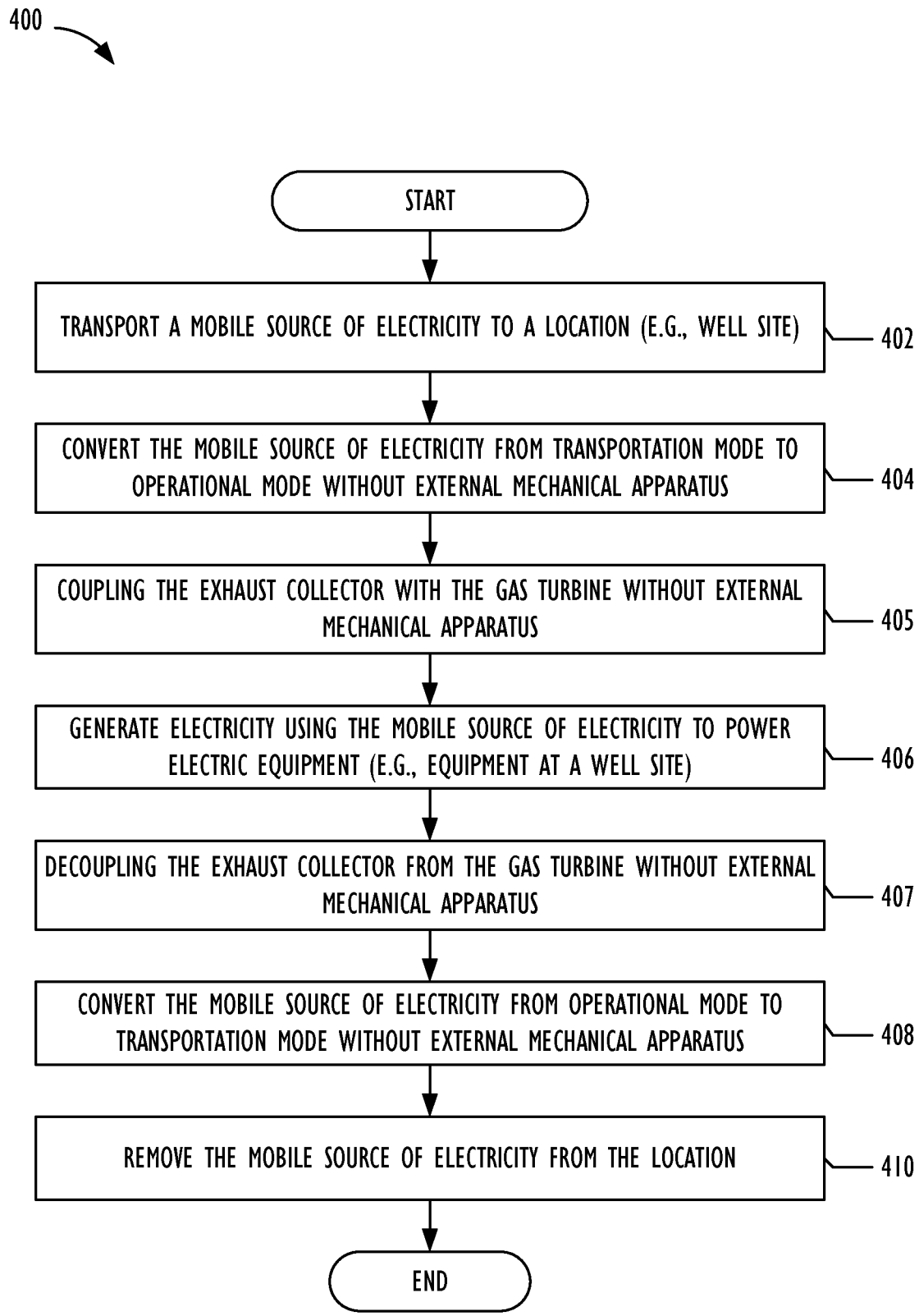
FIG. 4 is a flow chart of an embodiment of a method to provide a mobile source of electricity for various applications (e.g., hydraulic fracturing at a well site).

FIG. 4 is a flow chart of an embodiment of method 400 to provide a mobile source of electricity for any operation requiring a mobile power source (e.g., hydraulic fracturing at a well site as shown in FIG. 1). Method 400 may start at block 402 by transporting a mobile source of electricity (e.g., power generation transport 200, 200', 300) to a remote location. Method 400 may then move to block 404 and convert the mobile source of electricity from transportation mode to operational mode. The same transport may be used during the conversion from transportation mode to operational mode. In other words, transports are not added and/or removed when setting up the mobile source of electricity for operational mode. Additionally, method 400 may be performed without the use of a forklift, crane, and/or other external mechanical means to transition the mobile source of electricity into operational mode. Method 400 may then move to block 405 where the exhaust collector is coupled with the gas turbine without utilizing any external mechanical apparatus. The conversion and coupling processes for a single transport trailer are described above in detail in connection with FIGS. 2A-3D.

Method 400 may then move to block 406 and generate electricity using the mobile source of electricity to power a variety of operations requiring a mobile power source (e.g., hydraulic fracturing). In one embodiment, method 400 may generate electricity by converting hydrocarbon fuel into electricity using a gas turbine generator. Method 400 may then move to block 407 where the exhaust collector and the gas turbine are decoupled from each other without utilizing any external mechanical apparatus. Alternately, in case of the embodiment of power generation transport 200' shown in FIGS. 2F-2E, method 400 at block 407 may involve lowering the exhaust stack extension extending vertically upward from the top or roof of the enclosure of the power generation transport back downward by utilizing an elevating system disposed on the transport and without utilizing any external mechanical apparatus.

Method 400 may then move to block 408 and convert the mobile source of electricity from operational mode to transportation mode. Similar to block 404, and as explained in detail in connection with FIGS. 2A-3D, the conversion and decoupling/lowering processes for blocks 407 and 408 may use the same transports without using a forklift, crane, and/or other external mechanical means to transition the mobile source of electricity back to transportation mode. Method 400 may then move to block 410 to remove the mobile source of electricity along from the location after mobile power is no longer needed.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An apparatus for providing mobile electric power comprising:
    a power generation transport including:
        a generator;
        a power source configured to drive the generator;
        an air inlet filter housing;
        an inlet plenum coupled to the air inlet filter housing, configured for providing air to the power source;
        an exhaust collector configured for collecting exhaust from the power source;
        an exhaust implement that is coupled to the exhaust collector and that is vertically movable; and
        an elevating system configured to elevate the exhaust implement relative to an exhaust port of the power source in an operational mode of the power generation transport,
    wherein the air inlet filter housing, the inlet plenum, the exhaust collector, the exhaust implement, the power source, the generator, and the elevating system are mounted on the power generation transport.

2. The apparatus for providing mobile electric power according to claim 1, wherein:
    the power source comprises a gas turbine,
    the exhaust implement comprises an exhaust stack that is vertically coupled on top of the exhaust collector, and the elevating system is configured to elevate the exhaust collector and the exhaust stack in the operational mode, and
    the elevating system includes a first member configured to:
        raise the exhaust stack vertically upward and out of a top side of an enclosure of the power generation transport a predetermined vertical distance relative to the exhaust port of the gas turbine so as to be in an elevated standing position in the operational mode;
        align an exhaust coupling member of the exhaust collector with the exhaust port of the gas turbine mounted on the power generation transport when the exhaust stack is in the elevated standing position; and
        lower the exhaust stack vertically downward the predetermined vertical distance relative to the exhaust port of the gas turbine to house at least a portion of the exhaust stack within the enclosure of the power generation transport in a transportation mode of the power generation transport.

3. The apparatus for providing mobile electric power according to claim 2, wherein in the transportation mode, at least a portion of the exhaust collector extends below a base frame of the enclosure of the power generation transport so as to be supported by an underbelly truss extending below the enclosure.

4. The apparatus for providing mobile electric power according to claim 2, wherein the elevating system further includes a second member configured to:
    couple the exhaust coupling member of the exhaust collector with the exhaust port of the gas turbine in the operational mode; and decouple the exhaust coupling member of the exhaust collector from the exhaust port of the gas turbine in the transportation mode.

5. The apparatus for providing mobile electric power according to claim 4, wherein the second member of the elevating system is configured to laterally move the exhaust collector to couple the exhaust coupling member of the exhaust collector with the exhaust port of the gas turbine.

6. The apparatus for providing mobile electric power according to claim 4, wherein the first and second members of the elevating system are configured to operate in the operational and transportation modes without utilizing any external mechanical apparatus.

7. The apparatus for providing mobile electric power according to claim 1, wherein the power generation transport is a single transport, and wherein the elevating system comprises at least one of a hydraulic system, a pneumatic system, and an electric motor.

8. The apparatus for providing mobile electric power according to claim 1, wherein the power source is a gas turbine, and wherein the power generation transport further includes:
a gearbox; and
at least one base frame, wherein the base frame mounts and aligns the gas turbine, the gearbox, and the generator on the power generation transport.

9. The apparatus for providing mobile electric power according to claim 8, wherein the power generation transport further includes:
a gas conditioning system to condition hydrocarbon gas prior to combustion by the gas turbine;
a black start generator to provide power to start the gas turbine;
a generator breaker;
a transformer to lower a voltage output of the generator; and
a control system to control a power output of the gas turbine and the generator;
wherein the base frame further mounts the gas conditioning system, the black start generator, the generator breaker, the transformer, and the control system on the power generation transport.

10. The apparatus for providing mobile electric power according to claim 1, wherein:
the exhaust implement comprises an exhaust stack extension that is adapted to be housed in an exhaust stack of the power generation transport in a transportation mode,
the exhaust stack is vertically coupled on top of the exhaust collector, both the exhaust collector and the exhaust stack being fixedly mounted to the power generation transport, and
the exhaust collector is communicatively coupled to the exhaust port of the power source.

11. The apparatus for providing mobile electric power according to claim 10, wherein the elevating system is configured to:
raise the exhaust stack extension vertically upward and out of a top side of an enclosure of the power generation transport a predetermined vertical distance relative to the exhaust port of the power source so as to be in an elevated standing position in the operational mode; and
lower the exhaust stack extension vertically downward the predetermined vertical distance relative to the exhaust port of the power source to house at least a portion of the exhaust stack extension within the exhaust stack in the transportation mode, wherein a top of the exhaust stack is flush with the top side of the enclosure of the power generation transport.

12. A power generation transport comprising:
an air inlet filter housing;
an inlet plenum coupled to the air inlet filter housing;
a gas turbine;
a gearbox coupled to the gas turbine;
an exhaust collector adapted to be coupled to an exhaust port of the gas turbine in an operational mode of the power generation transport;
an exhaust implement that is coupled to the exhaust collector and that is vertically movable;
an elevating system configured to elevate the exhaust implement relative to the exhaust port of the gas turbine in the operational mode;
a generator driven by the gas turbine;
a gas conditioning system to condition hydrocarbon gas prior to combustion by the gas turbine;
a black start generator to provide power to start the gas turbine; and
at least one base frame, wherein the at least one base frame mounts and aligns the air inlet filter housing, the inlet plenum, the gas turbine, the exhaust collector, the exhaust implement, the elevating system, the gearbox, the generator, the gas conditioning system, and the black start generator on the power generation transport.

13. The power generation transport according to claim 12, wherein:
the exhaust implement comprises an exhaust stack that is vertically coupled on top of the exhaust collector, and the elevating system is configured to elevate the exhaust collector and the exhaust stack in the operational mode, and
the elevating system includes a first member configured to:
raise the exhaust stack vertically upward and out of a top side of an enclosure of the power generation transport a predetermined vertical distance relative to the exhaust port of the gas turbine so as to be in an elevated standing position in the operational mode;
align an exhaust coupling member of the exhaust collector with the exhaust port of the gas turbine when the exhaust stack is in the elevated standing position; and
lower the exhaust stack vertically downward the predetermined vertical distance relative to the exhaust port of the gas turbine to house at least a portion of the exhaust stack within the enclosure of the power generation transport in a transportation mode of the power generation transport.

14. The power generation transport according to claim 13, wherein, in the transportation mode, at least a portion of the exhaust collector extends below the base frame of the enclosure of the power generation transport and is supported by an underbelly truss extending below the enclosure.

15. The power generation transport according to claim 13, wherein the elevating system further includes a second member configured to:
couple the exhaust coupling member of the exhaust collector with the exhaust port of the gas turbine in the operational mode; and
decouple the exhaust coupling member of the exhaust collector from the exhaust port of the gas turbine in the transportation mode.

16. The power generation transport according to claim 15, wherein the second member of the elevating system is configured to laterally move the exhaust collector to couple the exhaust coupling member of the exhaust collector with the exhaust port of the gas turbine.

17. The power generation transport according to claim 15, wherein the first and second members of the elevating system are configured to operate to convert the power generation transport between in the operational and transportation modes without utilizing any external mechanical apparatus.

18. The power generation transport according to claim 12, wherein:
the exhaust implement comprises an exhaust stack extension that is adapted to be housed in an exhaust stack of the power generation transport in a transportation mode, and
the exhaust stack is vertically coupled on top of the exhaust collector, both the exhaust collector and the exhaust stack being fixedly mounted to the power generation transport.

19. The power generation transport according to claim 18, wherein the elevating system is configured to:
raise the exhaust stack extension vertically upward and out of a top side of an enclosure of the power generation transport a predetermined vertical distance relative to the exhaust port of the gas turbine so as to be in an elevated standing position in the operational mode; and
lower the exhaust stack extension vertically downward the predetermined vertical distance relative to the exhaust port of the gas turbine to house at least a portion of the exhaust stack extension within the exhaust stack in the transportation mode, wherein a top of the exhaust stack is flush with the top side of the enclosure of the power generation transport.

20. A method for providing mobile electric power, the method comprising:
converting a power generation transport from a transportation mode to an operational mode by elevating an exhaust collector and an exhaust stack mounted on the power generation transport to an elevated standing position, wherein the exhaust collector and the exhaust stack are vertically movable;
coupling the exhaust collector in the elevated standing position with an exhaust port of a gas turbine mounted on the power generation transport, wherein the exhaust collector and the exhaust stack are elevated to the elevated standing position relative to the exhaust port of the gas turbine, and the exhaust collector is coupled with the exhaust port of the gas turbine by an elevating system mounted on the power generation transport without utilizing any external mechanical apparatus; and
generating electricity by operating the gas turbine of the power generation transport in the operational mode.

21. The method for providing mobile electric power according to claim 20, wherein elevating the exhaust collector and the exhaust stack to the elevated standing position comprises:
raising the exhaust stack upward and out of a top side of an enclosure of the power generation transport by a predetermined vertical distance relative to the exhaust port of the gas turbine; and
aligning a coupling member of the exhaust collector with the exhaust port of the gas turbine mounted on the power generation transport; and
wherein the method further comprises lowering the exhaust stack vertically downward relative to the exhaust port of the gas turbine to house at least a portion of the exhaust stack within the enclosure of the power generation transport in the transportation mode.

22. The method for providing mobile electric power according to claim 21, further comprising decoupling the coupling member of the exhaust collector from the exhaust port of the gas turbine.

23. The method for providing mobile electric power according to claim 22, wherein the coupling member of the exhaust collector is decoupled and the exhaust stack is lowered relative to the exhaust port of the gas turbine without utilizing any external mechanical apparatus.

24. The method for providing mobile electric power according to claim 21, wherein, in the transportation mode, at least a portion of the exhaust collector extends below a base frame of the enclosure of the power generation transport and is supported by an underbelly truss extending below the enclosure.

* * * * *